United States Patent [19]

Acker

[11] 4,119,208

[45] Oct. 10, 1978

[54] ARRANGEMENT FOR THE MOVEMENT OF OBJECTS WITHIN THE DEPOSIT AREA OF SHELVES

[76] Inventor: Norbert Karl Acker, Falltorweg 5, 6079 Buchschlag, Germany

[21] Appl. No.: 674,495

[22] Filed: Apr. 7, 1976

[30] Foreign Application Priority Data

Apr. 16, 1975 [DE] Fed. Rep. of Germany ....... 2516725
Aug. 20, 1975 [DE] Fed. Rep. of Germany ....... 2536980
Aug. 20, 1975 [DE] Fed. Rep. of Germany ....... 2536998

[51] Int. Cl.² .............................................. A47F 7/00
[52] U.S. Cl. .................. 211/49 D; 211/134; 211/162
[58] Field of Search ................ 211/49 R, 49 D, 5, 94, 211/94.5, 162, 95, 134, 150; 214/16.4 C, 8.5 A, 8.5 B; 221/296, 134, 259, 268, 270, 272, 273; 198/773, 774; 186/1 A, 1 B, 26, 32, 33, 34; 193/38

[56] References Cited

U.S. PATENT DOCUMENTS

| 265,400 | 10/1882 | Fitch | 211/49 D |
|---|---|---|---|
| 2,973,856 | 3/1961 | Brooks | 198/773 X |
| 3,091,317 | 5/1963 | Just | 193/38 |

FOREIGN PATENT DOCUMENTS

184,098  6/1963  Sweden ................................ 211/49 D

Primary Examiner—Roy D. Frazier
Assistant Examiner—Terrell P. Lewis
Attorney, Agent, or Firm—Lane, Aitken, Dunner & Ziems

[57] ABSTRACT

An apparatus and method for moving objects across a storage area includes elongated guide means extending across the storage area along the direction of movement of the objects, frictional engagement means associated with and adapted for movement along the guide means for frictionally engaging a portion of the outer surface of the objects so that the frictional engagement means can simultaneously engage both the guide means and the objects and impart a condition whereby the frictional resistance between the frictional engagement means and the objects is greater than that between the objects and the support means and the frictional engagement means and the guide means for moving the objects. Alternatively, cooperating mating portions can be provided on a bar and an object engaging portion to accomplish the same results.

19 Claims, 15 Drawing Figures

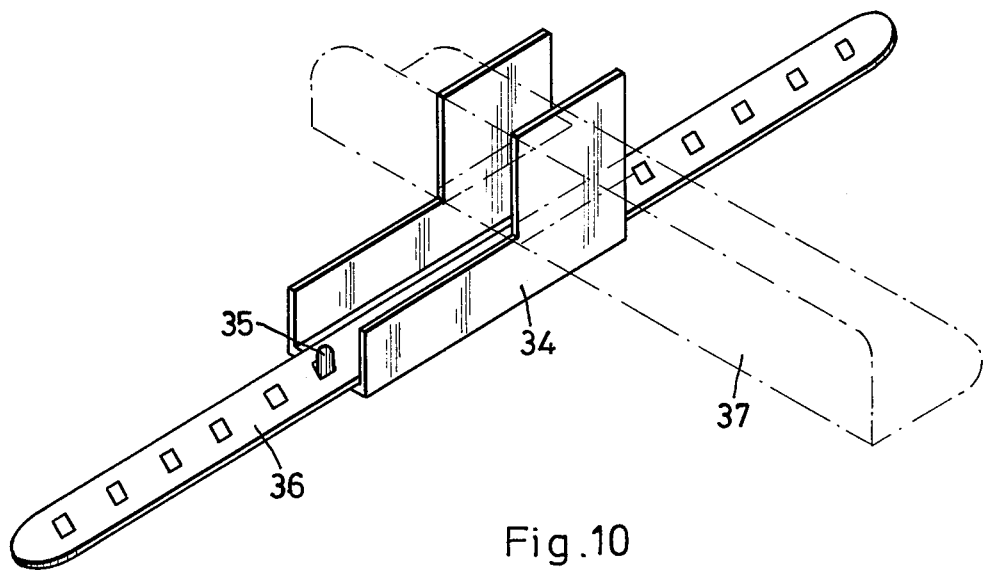
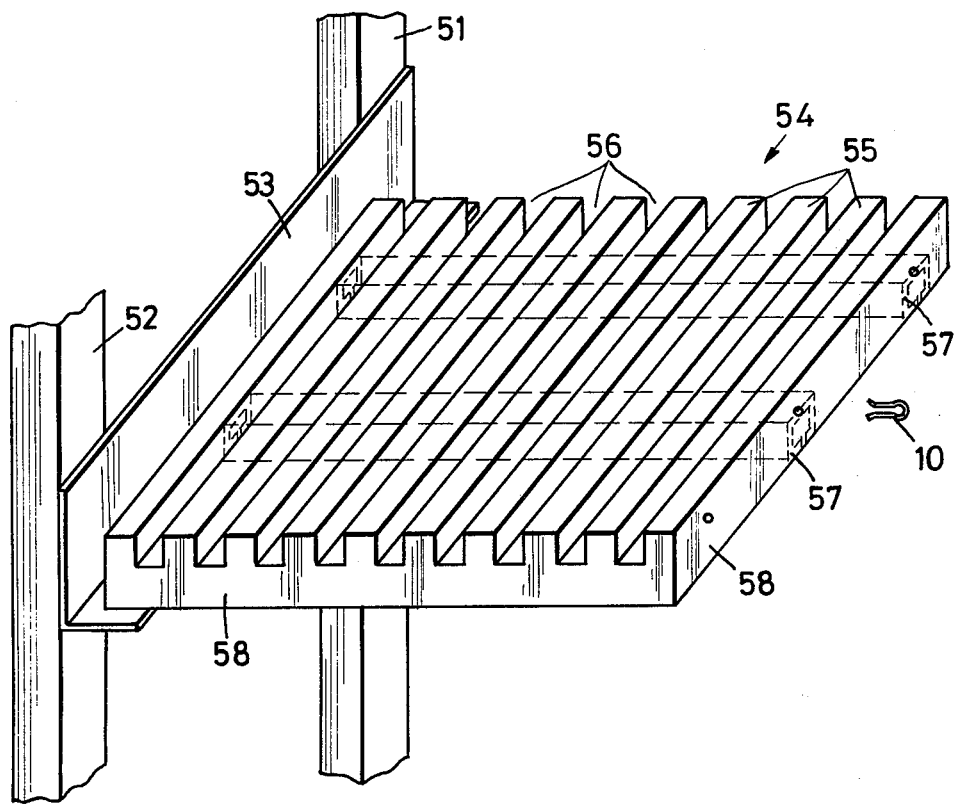

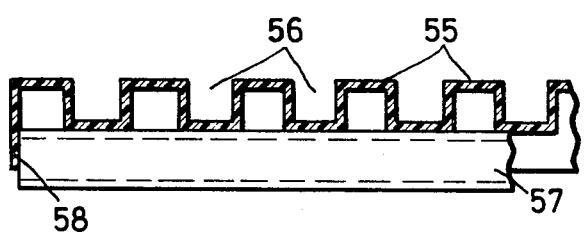
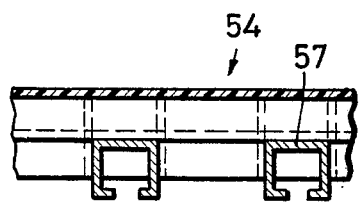
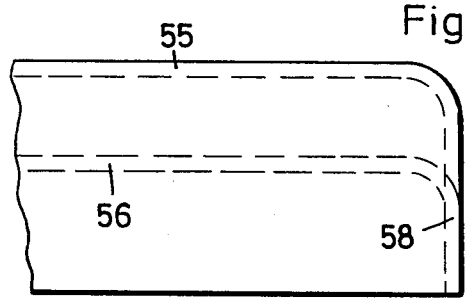
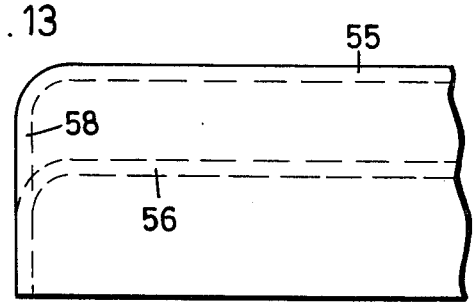
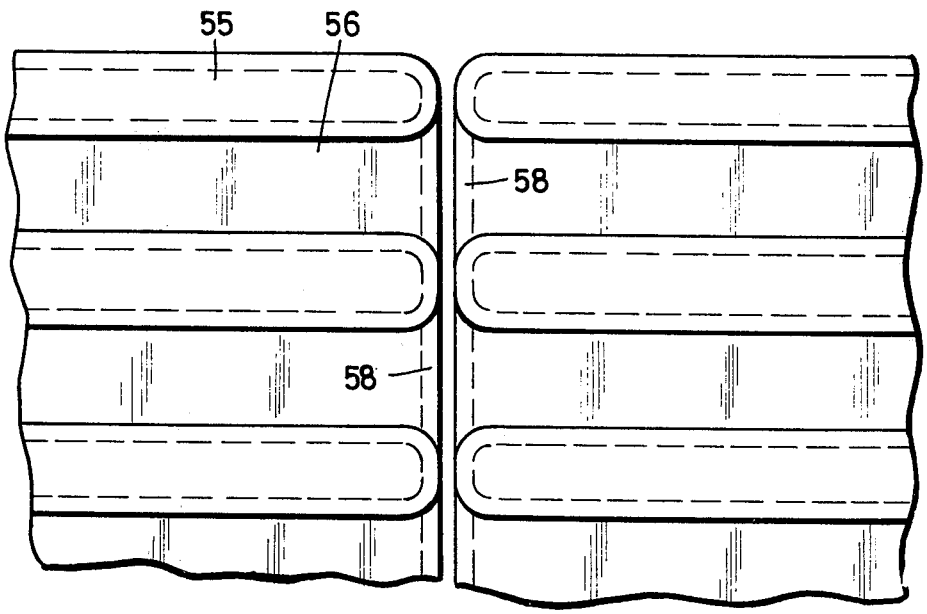

ARRANGEMENT FOR THE MOVEMENT OF OBJECTS WITHIN THE DEPOSIT AREA OF SHELVES

The invention relates to an arrangement for moving objects within the storage area of racks by means of slidably arranged bars.

A rack system for rationalising the field of factoring in warehouses requires the solution of a number of differing problems. On the other hand, it is a question of concentrating the range of goods in optimum manner on the removal side of the racks in order to be able to reduce the number of gangways between them. In this way, movement times are saved and the storage area is used to better effect.

On the other hand, concentration on the removal side, i.e. a reduction of the height and/or width of the racks, requires an extension of the racks in depth, the consequence of which is that conveying means must be used in the racks to bring the goods forwards for removal.

Added to this is the fact that an extreme reduction of the goods passage cross-sections, for example for factoring small packages, greatly reduces the filling factor of the rack, because then the proportion of space required for the rack and goods-passage elements increases relatively markedly.

An economic rationalisation can therefore be achieved only with a depth-utilizing run-through rack system, the goods passages and conveying means of which can be produced with a few simple and space-saving elements.

There are run-through racks with inclined goods passages which are either equipped with gravity-roller conveyors, which is very costly, or have slideways, which requires a larger, space-wasting sliding angle. In both cases it is disadvantageous that the foremost object must be removed under banking-up pressure and stacks running through may slip out of place if costly devices limiting the run-through speed are lacking.

Furthermore, there are horizontal run-through passages which, however, all operate with mechanically driven, revolving conveying means such as belts, rollers or chains, which is economic only for heavy goods to be conveyed by reason of the cost.

A rack system having horizontal goods passages is known (German patent specification No. 1,449,152) wherein the last goods unit in a passage is engaged at the rear by a slide which is connected via an aligning locking mechanism to a draw bar and pushes the series of goods unit forward on stroke-like actuation of the draw bar. The disadvantage in this case is that only a single feed device engaging the draw bar is present in each passage and must be drawn back by means of another bar when goods are replenished. Filling from the front is not possible.

The problem of the invention is to provide simple and space-saving means for moving goods in horizontal goods passages of run-through racks, which means permit filling of the passages from the front and back and avoid the drawbacks of the known rack systems.

In order to solve this problem, an arrangement for moving objects within the storage area of racks by means of slidably arranged bars is characterised according to the invention in that the bars and objects can be coupled to one another by twisting the bars and, with suitably chosen actuation of the bars, the objects can be moved in the coupled state in one direction or the other of sliding of the bars.

"Objects" within the meaning of the invention may be: the goods themselves, pallets, containers or the like for accommodating goods, as well as slides or cradles which shift the goods or pallet.

According to the invention, coupling between the object and the bar may be effected by frictional or mating contact.

In a particularly simple constructional form of the invention, a bar of substantially rectangular cross-section inserted in a channel at the base of the rack can be twisted by means of a handle about an axis extending in the longitudinal direction of the bar until the bar grips the objects lying over the channel by frictional contact with them. By manually shifting the bar, the frictionally gripped objects in the goods passage can then be pulled forward or pushed backward along the channel. The objects may be the goods themselves. In this way, simple access to the goods stored in the goods passage is possible and the goods passage can be filled from the front and from the rear.

In a somewhat more costly constructional form of the invention, the draw bar twisted in the channel can act on an object guided in the channel by mating contact with the object, for example by means of a pin and hole coupling, and the object may be in the form of a slide or cradle engaging the series of goods units at the rear.

The invention can be carried into effect in a particularly favourable manner in conjunction with a rack base or bottom the supporting surface of which is in the form of a ribbed plate in the grooves of which the feed elements for the goods formed from the bars and, if necessary, additional parts can be inserted. The ribbing of the supporting surface moreover gives the rack base an adequate bending resistance in one direction and also promotes the sliding-through of the goods by its skid-like action. Furthermore, partitions may be inserted in the grooves between the ribs. The ribbed plate, which is preferably produced from a plastic of high sliding capacity, may be supported by bearers extending transversely of the ribs and which are formed of a metal of high bending resistance. For practical use, it is an advantage for all the edges between the ribs and grooves and the rim of the ribbed plate to be rounded.

Further specific features of the invention will appear from the following description in conjunction with the drawing and from the claims.

In the drawing, which is purely diagrammatic and given by way of example:

FIG. 9 is a perspective view of the feed element used in the fourth embodiment;

FIG. 10 is a diagrammatic partial perspective view of a ribbed rack base or bottom, the grooves of which are suitable for inserting feed elements according to the invention;

FIG. 11 is a partial cross-section through the rack base according to FIG. 10;

FIG. 12 is a partial longitudinal section through the rack base according to FIG. 10; and FIGS. 13 and 14 shown on a larger scale in longitudinal section and plan view the end portions of two abutting rack bases according to the invention.

Figure 1:
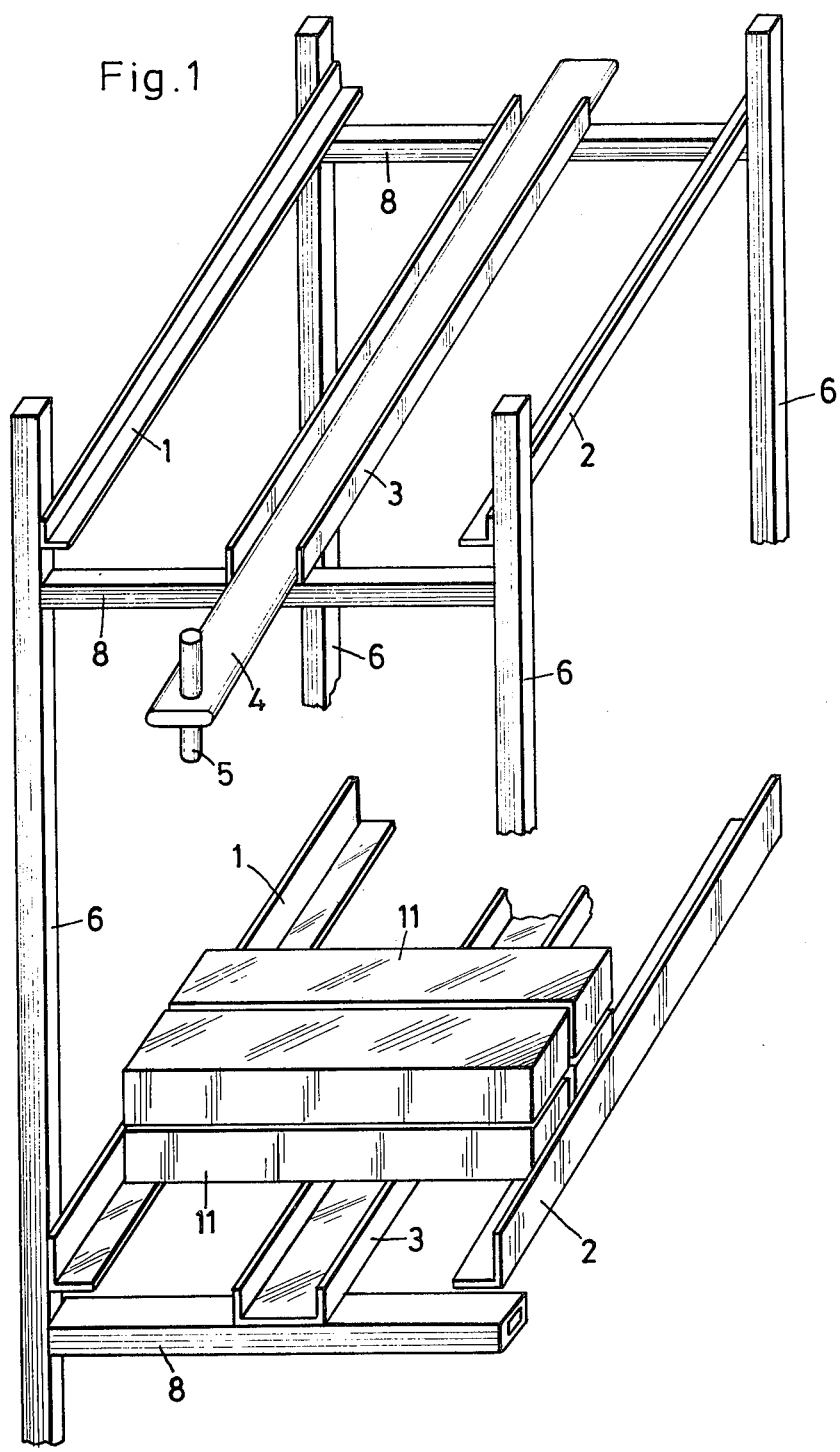
FIG. 1 is a partial perspective view of a first embodiment of the invention.
Figure 2A:
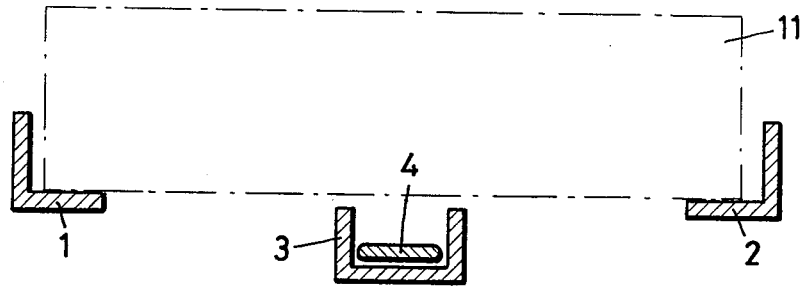
FIGS. 2A and 2B are end views of the first embodiment of the invention in the uncoupled and coupled state, respectively.
Figure 2B:
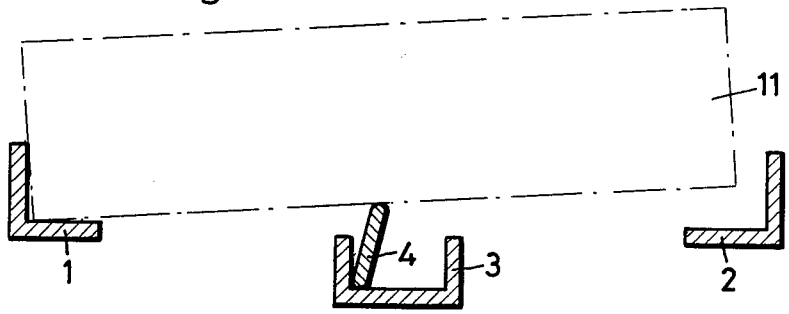

In the embodiment according to FIGS. 1, 2A and 2B, horizontally extending rack rails 1 and 2 in the form of angle irons form the goods passage of a run-through rack. The rack rails 1 and 2 may be mounted on vertical posts 6 of the rack in conventional manner, for example by means of screws. One or more objects 11, for example slabs, rest on the rack rails 1 and 2. Arranged substantially in the middle of the goods passage below the object or objects 11 is a guide channel 3 extending parallel to the rack rails 1 and 2 and having a U-shaped profile open at the top. The guide channel may be fixed to the rack rails and/or the rack posts 6 by means of transverse struts 8 in conventional manner, for example by welded joints. A bar 4 lies on the bottom of the guide channel 3. The bar 4 projects from the guide channel 3 at the front end of the rack to such an extent that it can be conveniently grasped with the hand. A handle 5, for example a cotter-pin handle or the like, may be arranged at this end of the bar. In the view of FIG. 1, the bar 4 in the lower channel 3 has been omitted for greater clarity. The posts 6 are shown only partially.

If the object 11 is to be moved in the goods passage, the bar 4 in the guide channel 3 is tilted in accordance with FIG. 2B, so that the driving surface of the bar 4 presses against a corresponding area of the object 11. The bar 4 coupled with the object 11 by frictional contact can then be pulled forward or pushed backward along the guide channel 3, taking the object 11 along with it.

In the shifting operation, it is not absolutely essential that the object 11 be raised as shown exaggeratedly in FIG. 2B. On the contrary, it is sufficient for the friction between the bar 4 and the object 11 to be greater than the friction between the object 11 and the rack rails 1 and 2 in order to carry the object 11 along, for example when the bar 4 is drawn out.

When the object 11 has reached the desired point, the bar 4 is swung back again, so that there is no longer any contact between the bar 4 and the object 11 and the bar 4 can be pushed into the rack again. To shift the object 11, the movement sequence described may be repeated several times in succession, so that it is necessary to run through only comparatively short shifting distances with the bar 4.

The object 11 is shown only purely diagrammatically, since it may be of greatly differing form and may, for example, represent the goods themselves, a pallet, a container or a slide for shifting the goods. The same also applies to the following Figures.

Figure 3:
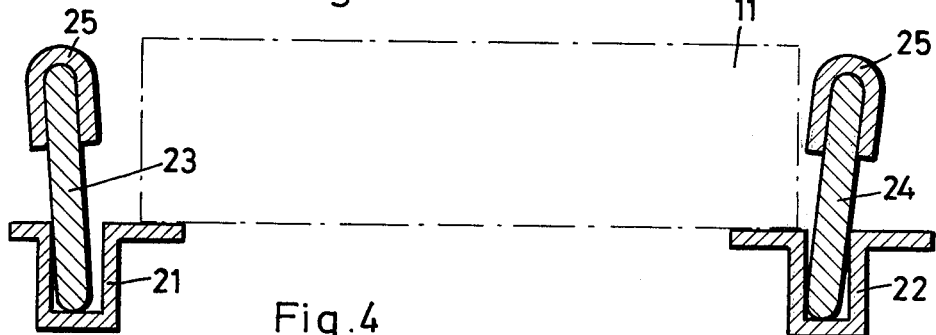
FIGS. 3 and 4 are similar views of a second embodiment of the invention.
Figure 4:
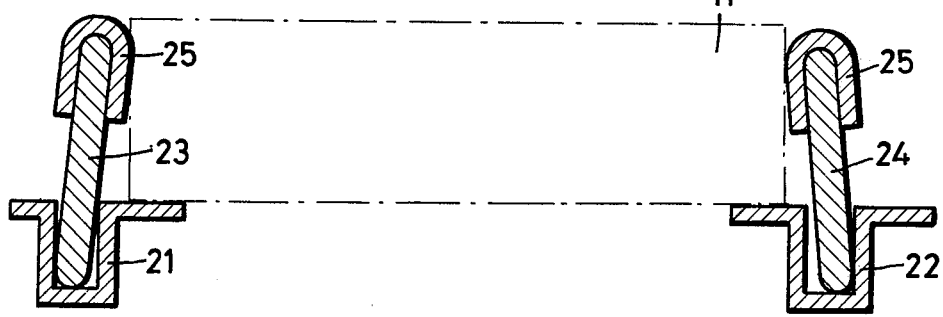

In the second embodiment according to FIGS. 3 and 4, guide channels 21 and 22, respectively, are arranged on both sides of the goods passage. The guide channels 21 and 22 may be worked into the rack rails bearing the object 11. Bars 23 and 24, respectively, are arranged on edge in each of the guide channels and are guided with a little lateral clearance. The upper edge of the bars 23 and 24 may be provided with a sheathing 25 increasing the frictional resistance. To move the object 11, one of the bars 23 and 24 projecting from the guide channels 21 and 22 is grasped with each hand and both bars are swung inwardly until the object 11 is engaged and clamped by the upper parts of the bars and their sheathing 25 as shown in FIG. 4. The clamping action is enhanced by the sheathing 25 which, for example, may also be in the form of a inner strip.

The shifting of the object is then effected in a similar manner to that described in the case of the first embodiment. When the object 11 has reached the desired position in the rack, both bars are swung back with both hands into their initial position shown in FIG. 3. The uncoupled bars can then be pushed back into the rack.

Figure 5:
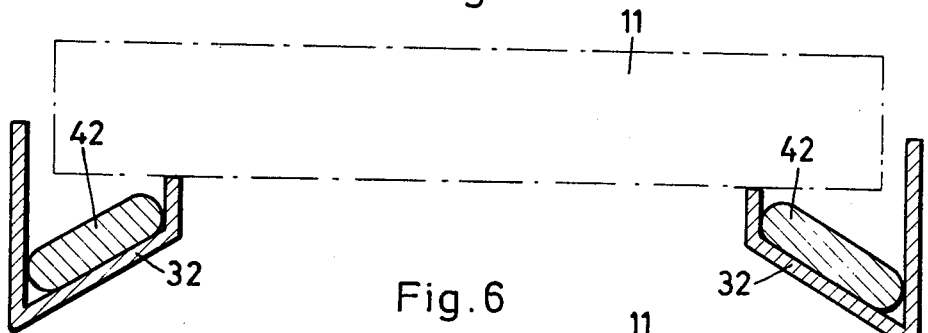
FIGS. 5 and 6 are similar views of a third embodiment of the invention.
Figure 6:
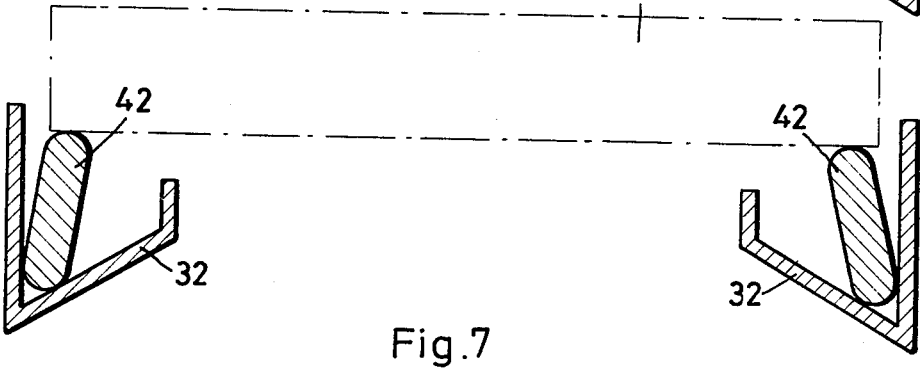

In the third embodiment according to FIGS. 5 and 6, the rack rails bearing the object 11 are in the form of guide channels 32 for bars 42. The mode of operation is similar to that in the case of the preceding embodiments. The bars 42 are arranged tiltably in the suitably profiled guide rails 32, so that the driving surfaces of the bars 42 can be pressed against the corresponding areas of the object 11 (FIG. 6).

In the above-described embodiments of the invention, coupling between the bars and the object is effected by frictional contact.

By suitable design of the driving surface of the bars, for example by milling or serration, and, if necessary, by corresponding design of the object, coupling between the bars and the object may also be effected by mating contact.

Figure 7:
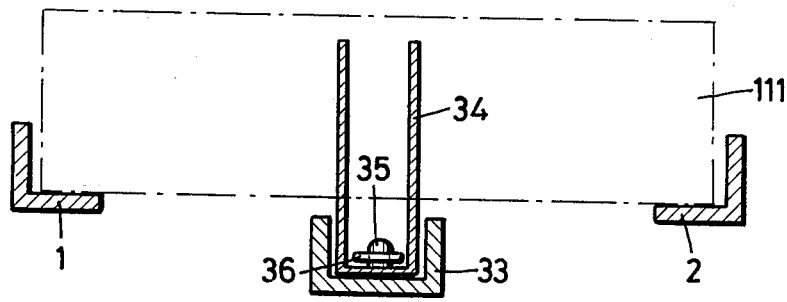
FIGS. 7 and 8 are similar views of a fourth embodiment of the invention.
Figure 8:
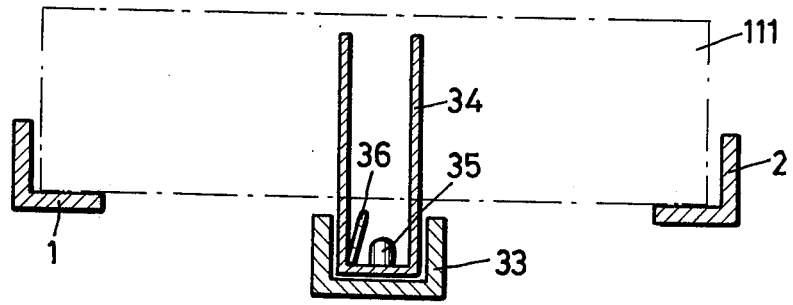

In the fourth embodiment shown in FIGS. 7, 8 and 9, coupling is carried out by mating contact. As in the embodiment according to FIGS. 1 and 2, horizontal rack rails 1 and 2 are provided on which a goods unit 111 rests. Arranged substantially in the middle of the goods passage below the goods 111 is a guide channel 33 for a U-shaped object 34 designed as a slide or cradle. The object 34, for example, has on the bottom thereof an inwardly directed pin 35. In the guide channel 33 extending horizontally parallel to the rack rails 1 and 2 there lies a perforated bar 36, which is moreover guided by the U-shaped object 34. When the bar 36 is lying flat on the bottom of the guide channel 33 and of the object 34, the bar 36 and the object 34 are connected to one another by mating contact by means of a pin and hole coupling. As long as this connection exists, the object 34 can be moved forward when the bar 36 is drawn out of the rack. The object 34 may engage the goods 111 directly or via auxiliary means, for example a drive rail 37.

FIG. 9 shows the feed element formed by the object 34, the perforated bar 36 and the drive rail 37 in perspective.

FIG. 10 shows a ribbed rack base 54 formed according to the invention, the grooves 56 of which are formed as guide channels for feed bars or feed elements according to the invention for the goods. Fixed to rack posts 51 and 52 is a horizontally extending angle iron 53 which serves as a lateral support for the rack base 54. The number, size and spacing of the posts and supports depend on the particular type of rack. The posts and the support for the rack base which are necessary on the right side have been omitted in FIG. 10 for greater clarity.

The rack base 54 consists of a supporting surface having ribs 55 which define the grooves 56. Bearers 57 extend transversely of the ribs 55 of the supporting surface in the form of a ribbed plate.

The ribs 55 and the grooves 56 of the supporting surface are so formed that the corrugations formed by them form lines extending in rectangular form relaive to one another in cross-section, as is apparent from FIGS. 10 and 11.

The supporting surface is surrounded on all sides by a downwardly directed rim 58 which projects downwardly from the upper edges of the ribs 55 beyond the grooves 56 without closing these grooves.

In a practical constructional form, all the edges between the ribs 55 and the grooves 56 and the rim 58 are rounded, as shown in FIGS. 13 and 14. In this way, with rack bases abutting at their end faces, the guiding capacity of the grooves for inserted feed bars or feed elements is improved. Furthermore, the shifting of the goods supported by the ribs 55 is facilitated, since inaccuracies of coincidence in the height and width of the ribs and grooves are compensated by smooth transitions.

As is apparent from FIG. 11, the lateral rims 58 of the ribbed plate form abutment zones for the bearers 57. The abutment zones may be of pocket-like form in order to accommodate the bearers. Instead of this, the end faces of the bearers may also abut the rim 58 directly from the inside and be secured by means of split pins 10.

In the embodiment illustrated, the bearers 57 consist of C irons. The ribbed plate is deep-drawn from a sheet or film of plastic.

The ribbed plate may also consist of injection-moulded plastic instead of a deep-drawn plastics sheet. The ribs and grooves may also be produced from extruded plastic on a one-unit or multiple basis. In this case, however, the end rim is eliminated.

The form of the bearers may likewise be modified. Thus, for example, a plurality of bearers may be combined to form a unit. With a corrugated conformation of the supporting surface, bearers may also be inserted from below into the cavities formed by the ribs. Hence, many modifications are possible. What is essential is that the interval between the individual bearer elements is so chosen that, in conformity with the supporting capacity required in a given instance, the bending resistance of the supporting surface in the direction of the ribs is not overtaxed.

The invention is not limited to the embodiments shown and described. On the contrary, it can be adapted in its details to the particular circumstances and/or requirements without departing from the basic idea of the invention.

This applies in particular to the cross-sectional form both of the guide channels and of the bars and to the form of the driving edges of the bars and of the driving surfaces of the objects.

I claim:

1. Apparatus for moving an object across a storage area, comprising support means for supporting the object extending in a longitudinal direction across the storage area, elongated guide means extending across the storage area in the longitudinal direction, elongated bar means associated with and adapted for movement along the guide means and having its major axis extending along the longitudinal direction for frictionally engaging a portion of the outer surface of the objects, the guide means and bar means being sized, shaped and located so that when the bar means is rotated about its longitudinal axis it will simultaneously engage both the guide means and the object and impart a condition whereby the frictional resistance between the bar means and the object is greater than that between the object and the support means so that when said condition is achieved movement of the bar means in the direction of its longitudinal axis relative to the guide means will operate to move the object.

2. The apparatus in claim 1, wherein the guide means is located lower than the portion of the support means which supports the object, and the bar means is sized and shaped so that when the bar means is rotated about its longitudinal axis it will engage both the guide means and a bottom surface of the object.

3. The apparatus in claim 2, wherein the guide means includes a single guide located along the center line of the object, and the support means includes at least one rack rail located on each side of the guide means.

4. The apparatus in claim 2, wherein the guide means includes a U-shaped channel open at the top.

5. The apparatus in claim 2, wherein the support means includes a rack rail located inward along each outer edge of the object, the guide means including a guide channel located outward of each rack rail, and a bar means for cooperating with each guide channel.

6. The apparatus in claim 5, wherein each associated rack rail and guide channel are formed of one piece.

7. The apparatus in claim 2, wherein the support means and elongated guide means include a supporting surface with a plurality of grooves therein for guiding a plurality of bar means.

8. The apparatus in claim 7, wherein the grooves are arranged in a ribbed plate forming the supporting surface and which is made of a plastic of high sliding capacity, and further including bearers supporting the ribbed plate formed of metal of high bending resistance.

9. The apparatus in claim 8, wherein the bearers extend transversely of the ribs of the ribbed plate.

10. The apparatus in claim 8, wherein the grooves and the ribs are formed by corrugation of the plate and the corrugations form in cross-section lines extending substantially at right angles to one another.

11. The apparatus in claim 8, wherein the ribbed surface is surrounded on all sides by a downwardly directed rim which projects downwardly from the upper edges of the ribes beyond the grooves without closing these grooves.

12. The apparatus in claim 11, wherein all the edges between the ribs and the grooves and the rim are rounded.

13. The apparatus in claim 1, wherein the guide means includes a guide located outwardly of each side of the objects, the frictional engagement means including bar means associated with and adapted for movement along each guide means, each guide means including a guide channel surface extending along the direction of movement of the object for engaging one edge of the bar means, the guide means being located so that when each bar means engages said surface in its respective guide means and is twisted it will engage a side of the object.

14. The apparatus in claim 13, wherein the portion of each bar means which contacts the objects includes sheathing for increasing the frictional resistance between it and the object.

15. The apparatus in claim 13, wherein the guide means and support means are formed of one piece.

16. Method for moving an object across a storage area comprising the steps of:
(a) supporting an object on a support means extending in a longitudinal direction adapted to allow the object to slide along the longitudinal direction;
(b) locating bar means in guide means located in close proximity to the object, the bar means having an axis extending along the longitudinal direction;

(c) rotating the bar means in the guide means about the longitudinal axis until the bar means engages both the guide means and object and creates a frictional resistance between the bar means and object greater than that between the object and support means; and (d) moving the bar means along its longitudinal axis for moving the object.

17. The method of claim 16, wherein the step of rotating includes rotating the bar means in a guide located underneath the object.

18. The method of claim 16, wherein the step of twisting includes twisting bar means in guides located underneath the objects along opposing sides thereof, both bar means engaging the bottom of the objects.

19. The method of claim 16, wherein the step of twisting includes twisting bar means in guides located outwardly of opposing sides of the objects, both bar means engaging the sides of the objects.

* * * * *